Jan. 10, 1933.   A. M. ZOTTOLI   1,893,607
METHOD OF MAKING BUILDING MATERIAL
Filed March 19, 1930
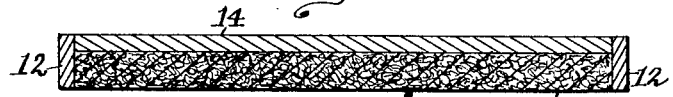
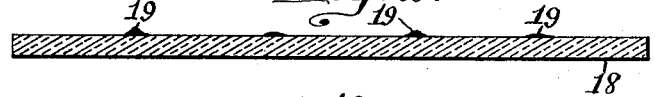
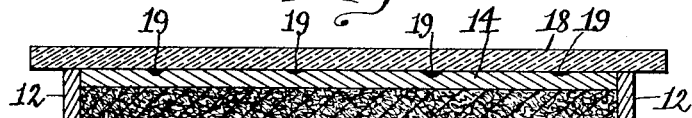
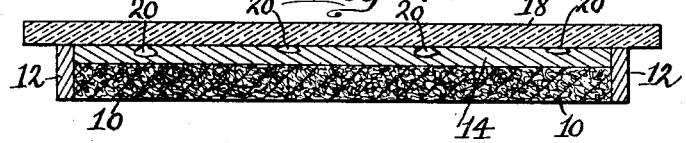
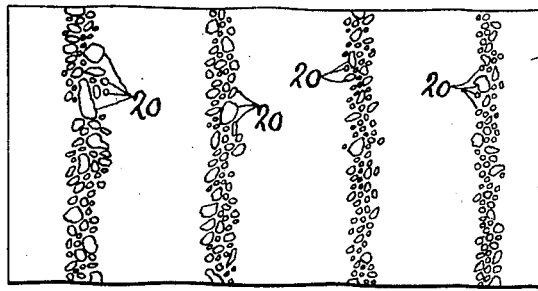
Inventor
Anthony M. Zottoli
by Jas. H. Churchill
Atty.

Patented Jan. 10, 1933

1,893,607

UNITED STATES PATENT OFFICE

ANTHONY M. ZOTTOLI, OF QUINCY, MASSACHUSETTS

METHOD OF MAKING BUILDING MATERIAL

Application filed March 19, 1930. Serial No. 437,186.

This invention relates to a building material and to the method of making the same.

One object of the invention is to provide a building material in sheet form possessing a novel, characteristic and highly attractive appearance, which may be economically manufactured and which simulates in appearance and can be used as a substitute for travertine or Italian marble in the construction of walls and other portions of a building, and for other building purposes.

A further object of the invention is to provide a novel and highly efficient method for the manufacture of the improved building material.

With these objects in view and such others as may hereinafter appear, the invention consists in the building material and in the method of making the same hereinafter described and particularly pointed out in the claims at the end of this specification.

In the drawing I have illustrated the improved building material and also the partially completed material in different steps in its manufacture, wherein Figs. 1, 2, 3 and 4 are sectional views illustrating successive steps in the manufacture of the improved building material to be referred to; Fig. 5 is a plan of the improved building material illustrating the vein-like appearance and structure of the improved building material; and Fig. 6 is a similar view on an enlarged scale to be referred to.

In general the invention contemplates a building product in sheet form provided with a plastic surface having a characteristic appearance imparted to it by the formation of cavities of irregular shape and of varying size, preferably arranged to appear like travertine or Italian marble, in veins extended across the surface of the material. In accordance with the preferred method of making the improved building material, the cavities may and preferably will be formed in the plastic material by gas generated in the upper portions of the plastic material adjacent the surface thereof. The gas may and preferably will be formed by the action of an acid such as tartaric acid upon basic material such as a carbonate forming a part of the plastic, and as the gas is generated within the body of the plastic near the upper surface thereof, the upper surface may preferably be sealed to confine the gas and cause it to form characteristic cavities of irregular shape in the surface, and which are in effect undercut so that the portion of the cavity within the body of the material is larger than the opening at the surface, presenting a characteristic appearance to the surface.

As illustrated in the drawing, and in accordance with the preferred method of manufacturing the improved building material, a backing or foundation member 10 which may and preferably will comprise a sheet of fibrous material such as fibrous wallboard, is positioned within a mold 12 and provided upon its upper surface with a layer 14 of substantial thickness comprising plastic material such as plaster of Paris, Keene's cement, or like material. The upper surface of the plastic layer may be then smoothed with a trowel or other implement. In order to produce the design or characteristic vein-like appearance in the surface of the material approaching that of travertine or Italian marble, it is preferred to apply an acidic reagent such as a solution of tartaric acid to the under surface of a sealing member 18, preferably comprising a glass plate, an oiled paper, or similar sealing member and to rest the sealing member directly upon the upper surface of the plastic layer within the mold 12, as illustrated in Fig. 3. The tartaric acid or other acidic reagent may and preferably will be applied to the sealing member 18 in spaced strips or bands 19 while the sealing member is in a horizontal position such as is illustrated in Fig. 2, so that reaction between the acid and the basic materials usually present in the commercial forms of plaster of Paris, Keene's cement, and the like, will produce a series of irregular shaped individual cavities 20, and these being arranged in spaced bands impart to the surface a vein-like appearance characteristic of travertine or Italian marble.

The glass or other sealing member is permitted to remain in place in the mold until the reaction has been completed between the acid and the basic materials in the plastic in contact therewith. With most of the commercial plastics sufficient carbonate will be present to provide a gaseous product as a result of the reaction with the acid, so that the cavities formed by the gas in the surface of the plastic will be of the general character illustrated in section in Fig. 4. It has been found that the sealing of the upper surface of the plastic layer operates to produce undercut cavities in which sharp edges are formed at the mouths of the cavities, with the body of the cavity of greater width than the mouth, presenting a characteristic appearance which adds to the similarity between the present product and the genuine Italian marble or travertine. After the reaction has been completed, the glass or other sealing member may be removed and the surface of the plastic layer coated with an oil or other polishing fluid and the surface polished. When the plastic has become hardened, the composite material including the foundation member 10 and the plastic layer 14 may be removed and is ready for use. If desired, colors and tints may be imparted to the cavities in the surface by mixing the color either in dry form or in soluble form with the acidic solution such as the tartaric acid solution. In some instances it may be desirable to apply the acid in the form of a dry powder such as crystalline tartaric acid, and while the reaction is slower, the water in the plastic rises to the surface and gradually dissolves the tartaric acid and permits the reaction to take place with the production of the irregular cavities.

The strength of the acid and the concentration of the acid solution, as well as the amount of acidic solution applied, controls the depth and general size of the cavities produced in the surface of the plastic, and variations in the acidic solution may be utilized to produce varying sizes and depths of cavities, thus adding to the attractiveness of the material.

From the above description it will be observed that the present composite material may be economically made and used with advantage as a building material. The base of the material, preferably of a fibrous nature, such as fibrous wallboard may be readily attached to a building structure to provide a wall or other surface having the artistic appearance of travertine or an Italian marble. The cavities in the surface, produced as above described, resemble closely the natural porosity of the surface of genuine travertine.

While the preferred form of the invention and its method of manufacture have been herein illustrated and described, it will be understood that the invention may be embodied in other forms and produced by other methods within the scope of the following claims.

Having thus described the invention, what is claimed is:—

1. The method of making a building material of the character specified which consists in molding a layer of plastic material of a character capable of reaction with an acidic solution to form a gas, applying an acidic solution to the upper surface of the plastic layer and sealing the upper surface until the gas forming reaction is completed whereby undercut cavities are formed in the upper surface of the plastic layer.

2. The method of making a building material of the character specified, which consists in applying to the upper surface of a plastic layer a reagent of a character capable of reaction with the plastic to form a gas, and confining the gas as it is formed until the reaction is completed whereby undercut cavities are formed in the upper surface of the plastic.

3. The method of making a building material of the character specified, which consists in forming a layer of plastic cementitious material upon the surface of a backing member, applying a solution of tartaric acid in the general form of the desired vein-like design to the surface of a sealing member, applying the sealing member with the tartaric acid thereon upon the upper surface of the plastic layer and permitting the same to remain until the gas forming reaction is completed, and then removing the sealing member whereby a vein-like design formed by undercut cavities is produced in the upper surface of the plastic layer.

In testimony whereof, I have signed my name to this specification.

ANTHONY M. ZOTTOLI.